(12) United States Patent
Takahashi et al.

(10) Patent No.: US 12,225,392 B2
(45) Date of Patent: Feb. 11, 2025

(54) TERMINAL AND COMMUNICATION METHOD FOR BEAM FAILURE RECOVERY

(71) Applicant: NTT DOCOMO, INC., Tokyo (JP)

(72) Inventors: Hideaki Takahashi, Tokyo (JP); Yuki Matsumura, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 324 days.

(21) Appl. No.: 17/753,342

(22) PCT Filed: Sep. 13, 2019

(86) PCT No.: PCT/JP2019/036137
§ 371 (c)(1),
(2) Date: Feb. 28, 2022

(87) PCT Pub. No.: WO2021/049014
PCT Pub. Date: Mar. 18, 2021

(65) Prior Publication Data
US 2022/0295315 A1   Sep. 15, 2022

(51) Int. Cl.
*H04L 45/28* (2022.01)
*H04W 24/04* (2009.01)
*H04W 74/0833* (2024.01)

(52) U.S. Cl.
CPC ....... *H04W 24/04* (2013.01); *H04W 74/0833* (2013.01)

(58) Field of Classification Search
CPC ............. H04W 24/04; H04W 74/0833; H04W 76/19; H04W 16/28; H04B 7/0695; Y02D 30/70; H04L 5/0053

USPC .......................................................... 370/225
See application file for complete search history.

(56) References Cited

U.S. PATENT DOCUMENTS

2019/0230730 A1* 7/2019 Wang ................ H04W 74/0833
2020/0260300 A1* 8/2020 Cirik ..................... H04W 24/08
2021/0051754 A1* 2/2021 Zhou ..................... H04W 76/15

FOREIGN PATENT DOCUMENTS

WO   2019/032882 A1   2/2019
WO   2019/139527 A1   7/2019

OTHER PUBLICATIONS

ZTE (R1-1812266, "Discussion on draft CRs on beam management", Nov. 12-16, 2018) (Year: 2018).*
ETSI TS 138 2013 V15.5.0 (May 2019), Physical layer procedures for control (Year: 2019).*
Extended European Search Report issued in counterpart European Application No. 19945019.8 mailed on Apr. 25, 2023 (11 pages).
MediaTek Inc.; "Summary on Beam Failure Recovery"; 3GPP TSG RAN WG1 Meeting #95, R1-1814069; Spokane, US; Nov. 12-16, 2018 (27 pages).

(Continued)

*Primary Examiner* — Maharishi V Khirodhar
(74) *Attorney, Agent, or Firm* — Osha Bergman Watanabe & Burton LLP

(57) ABSTRACT

A terminal includes a transmitter that transmits a random access preamble; a receiver that receives a random access response; and a controller that uses a spatial filter applied to the transmission of the random access preamble for a transmission of an uplink control signal, in a time interval after the receiver receives the random access response until the receiver receives configuration information of another spatial filter.

5 Claims, 6 Drawing Sheets

(56) References Cited

OTHER PUBLICATIONS

Office Action issued in counterpart Chinese Patent Application No. 201980100169.5 mailed on Jun. 7, 2023 (15 pages).
Office Action issued in counterpart Korean Patent Application No. 10-2022-7007663 mailed on Jun. 17, 2023 (8 pages).
Office Action issued in the counterpart Russian Patent Application No. 2022104150/07(008699), mailed on Feb. 15, 2023 (12 pages).
3GPP TSG RAN WG1 Meeting #95; R1-1813486 "Maintenance for Beam Management" Nokia, Nokia Shanghai Bell; Spokane, USA; Nov. 12-16, 2018 (4 pages).
3GPP TSG RAN WG1 Meeting #96; R1-1901756 "Draft CR on CORESET#0 after gNB response for recovery" ZTE; Athens, Greece; Feb. 25-Mar. 1, 2019 (3 pages).
3GPP TSG-RAN WG2 Meeting #105; R2-1901256 "Correction to SSB selection with CBRA" Nokia, Nokia Shanghai Bell; Athens, Greece; Feb. 25-Mar. 1, 2018 (5 pages).
3GPP TSG-RAN WG2 Meeting #105; R2-1901255 "Discussion on BFR with CBRA" Nokia, Nokia Shanghai Bell; Athens, Greece; Feb. 25-Mar. 1, 2019 (3 pages).
3GPP TS 38.211 V15.3.0 "3rd Generation Partnership Project; Technical Specification Group Radio Access Network; NR; Physical channels and modulation (Release 15)" Sep. 2018 (96 pages).
3GPP TS 38.300 V15.3.0 "3rd Generation Partnership Project; Technical Specification Group Radio Access Network; NR; NR and NG-RAN Overall Description; Stage 2 (Release 15)" Sep. 2018 (92 pages).
3GPP TS 38.321 V15.3.0 "3rd Generation Partnership Project; Technical Specification Group Radio Access Network; NR; Medium Access Control (MAC) protocol specification (Release 15)" Sep. 2018 (76 pages).
International Search Report issued in International Application No. PCT/JP2019/036137, mailed Apr. 14, 2020 (3 pages).
Written Opinion issued in International Application No. PCT/JP2019/036137; Dated Apr. 14, 2020 (3 pages).
Office Action issued in counterpart Indian Patent Application No. 202217007520 mailed on Dec. 28, 2023 (6 pages).
Office Action issued in counterpart Korean Patent Application No. 10-2022-7007663 mailed on Jan. 30, 2024 (6 pages).
3GPP TSG-RAN WG2 Meeting #102; R2-1807405 "Discussion on the Beam failure recovery timer" ZTE; Busan, Korea; May 21-25, 2018 (5 pages).
Office Action issued in Chinese Application No. 201980100169.5; Dated Dec. 1, 2023 (15 pages).
Office Action issued in counterpart Egyptian Patent Application No. 2022030280 mailed on Dec. 17, 2023 (12 pages).

* cited by examiner

TERMINAL AND COMMUNICATION METHOD FOR BEAM FAILURE RECOVERY

TECHNICAL FIELD

The present invention relates to a terminal and a communication method in a radio communication system.

BACKGROUND ART

As for New Radio (NR) (also referred to as "5G"), which is a successor system to Long Term Evolution (LTE), a technique has been studied (e.g., Patent Document 1) that satisfies requirements, such as those of a large capacity system, a high data transmission rate, low latency, simultaneous connection of multiple terminals, low cost, and power saving.

The NR uses a higher frequency band than the LTE. Since a propagation loss increases in a high frequency band, in order to compensate for a propagation loss, it has been studied to enhance received power by applying beamforming with a narrow beam width to a radio signal (e.g., Non-Patent Document 2).

RELATED ART DOCUMENT

Non-Patent Document

Non-Patent Document 1: 3GPP TS 38.300 V15.3.0 (2018 September)

Non-Patent Document 2: 3GPP TS 38.211 V15.3.0 (2018 September)

Non-Patent Document 3: 3GPP TSG-RAN WG2 Meeting #105, R2-1901255, Athens, Greece, 25 Feb.-1 Mar. 2019

Non-Patent Document 4: 3GPP TSG-RAN WG2 Meeting #105, R2-1901256, Athens, Greece, 25 Feb.-1 Mar. 2019

Non-Patent Document 5: 3GPP TS 38.321 V15.3.0 (2018 September)

SUMMARY OF THE INVENTION

Problem to be Solved by the Invention

Beam Failure Recovery (BFR) is executed by a terminal based on a Contention Free Random Access procedure (CFRA). However, when a beamFailureRecoveryTimer (Non-Patent Document 5) expires, the terminal falls back to a Contention-Based Random Access procedure (CBRA), and the terminal performs the BFR using the CBRA.

There is a need for a method of clarifying a beam (QCL) assumed by a terminal after CBRA.

Means for Solving the Problem

According to an aspect of the present invention, there is provided a terminal including a transmitter that transmits a random access preamble; a receiver that receives a random access response; and a controller that uses a spatial filter applied to the transmission of the random access preamble for a transmission of an uplink control signal, in a time interval after the receiver receives the random access response until the receiver receives configuration information of another spatial filter.

Advantage of the Invention

According to an embodiment, a method of clarifying a beam assumed by a terminal after CBRA is provided.

EMBODIMENTS OF THE INVENTION

Figure 1:
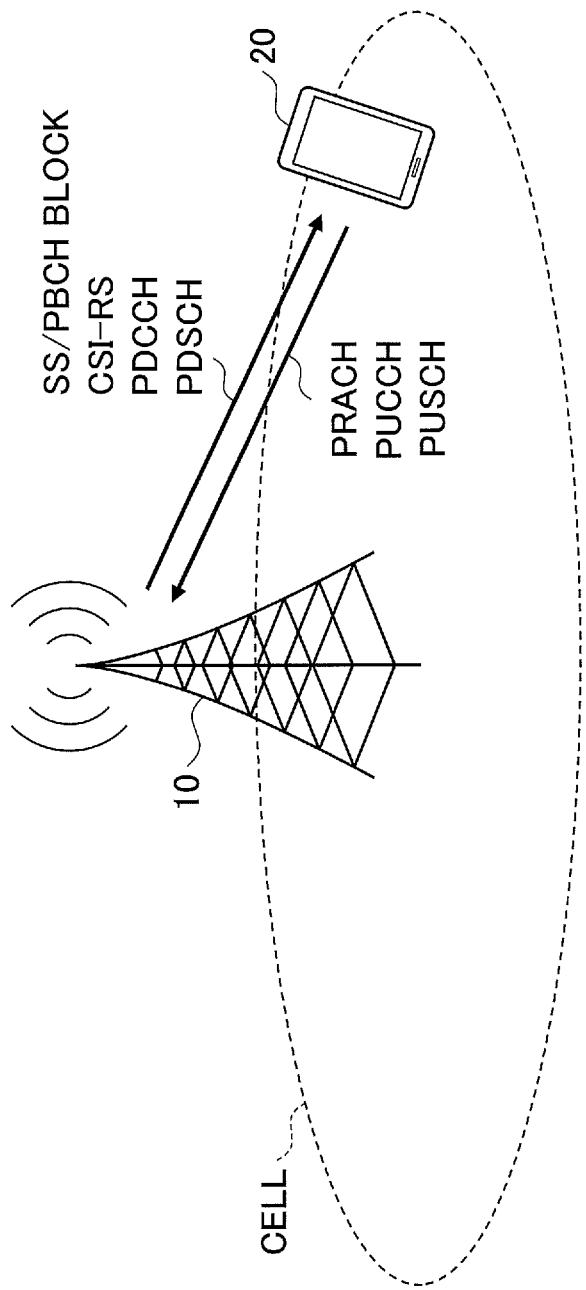
FIG. 1 is a diagram illustrating a radio communication system according to an embodiment of the present invention.

In the following, embodiments of the present invention are described by referring to the drawings. Note that the embodiments described below are examples, and embodiments to which the present invention is applied are not limited to the embodiments below.

For an operation of a radio communication system according to the embodiments of the present invention, existing technology is used as appropriate. The existing technology is, for example, the existing LTE. However, the existing technology is not limited to the existing LTE. The term "LTE" as used herein also has broad meaning, including LTE-Advanced and a system subsequent to the LTE-Advanced (e.g., NR), unless otherwise indicated.

In the embodiments of the present invention described below, terms used in the existing LTE are used, such as SS (Synchronization Signal), PSS (Primary SS), SSS (Secondary SS), PBCH (Physical Broadcast channel), and PRACH (Physical Random Access channel). This is for convenience of description, and signals and functions similar to these may be referred to by other names. The above-described terms in NR correspond to NR-SS, NR-PSS, NR-SSS, NR-PBCH, NR-PRACH, and the like. However, even if a signal is used for NR, the signal is not always explicitly indicated as "NR-."

In embodiments of the present invention, a duplex method may be a TDD (Time Division Duplex) method, an FDD (Frequency Division Duplex) method, or any other method (e.g., Flexible Duplex, and the like).

In the following description, a method of transmitting a signal using a transmit beam may be digital beamforming in which a signal multiplied by a precoding vector (precoded with the precoding vector) is transmitted, or analog beamforming in which beamforming is implemented using a variable phase shifter in an RF (Radio Frequency) circuit. Similarly, a method of receiving a signal using a receiving beam may be digital beamforming in which a received signal is multiplied by a predetermined weight vector, or analog beamforming, in which beamforming is implemented using a variable phase shifter in an RF circuit. Hybrid beamforming combining digital beamforming and analog beamforming may be applied to transmission and/or reception. Transmitting a signal using a transmit beam may be transmitting the signal with a specific antenna port. Similarly, receiving a signal using a receiving beam may be receiving the signal with a specific antenna port. An antenna port refers to a logical antenna port or a physical antenna port defined by the 3GPP standard. The above-described precoding or beamforming may be referred to as a precoder, a spatial domain filter, or the like.

Note that a method of forming a transmit beam and receiving beam is not limited to the above-described methods. For example, in a base station apparatus 10 or a terminal 20 having multiple antennas, a method of changing an angle of each antenna may be used, a method of using a precoding vector and a method of changing the angle of the antenna may be used, a method of switching different antenna panels may be used, a method of combining multiple antenna panels may be used, or other methods may be used. For example, in a high frequency band, a plurality of mutually different transmit beams may be used. The use of multiple transmit beams is called multi-beam operation, and the use of a single transmit beam is called single-beam operation.

In the embodiments of the present invention, to "configure" a radio parameter or the like may be to pre-configure a predetermined value, or to configure the radio parameter signalled from the base station apparatus 10 or the terminal 20.

FIG. 1 is a diagram illustrating a radio communication system according to an embodiment of the present invention. The radio communication system in an embodiment of the present invention includes a base station apparatus 10 and a terminal 20, as depicted in FIG. 1. In FIG. 1, one base station apparatus 10 and one terminal 20 are depicted. However, this is an example, and, for each of the devices, there may be a plurality of devices.

The base station apparatus 10 is a communication device that provides one or more cells and performs radio communication with the terminal 20. A physical resource of a radio signal is defined in a time domain and a frequency domain, the time domain may be defined by a number of OFDM symbols, and the frequency domain may be defined by a number of sub-carriers or a number of resource blocks. The base station apparatus 10 transmits a synchronization signal and system information to the terminal 20. A synchronization signal is, for example, NR-PSS and NR-SSS. A part of system information is transmitted, for example, by NR-PBCH, which is also called broadcast information. A synchronization signal and broadcast information may be periodically transmitted as an SS block (SS/PBCH block) consisting of a predetermined number of OFDM symbols. For example, the base station apparatus 10 transmits a control signal or data in Downlink (DL) to the terminal 20 and receives a control signal or data in Uplink (UL) from the terminal 20. The base station apparatus 10 and the terminal 20 are capable of transmitting and receiving signals while performing beamforming. For example, as illustrated in FIG. 1, a reference signal transmitted from the base station apparatus 10 includes a Channel State Information Reference Signal (CSI-RS), and a channel transmitted from the base station apparatus 10 includes a Physical Downlink Control Channel (PDCCH) and a Physical Downlink Shared Channel (PDCCH).

The terminal 20 is a communication device provided with a radio communication function, such as a smartphone, a cellular phone, a tablet, a wearable terminal, and a communication module for Machine-to-Machine (M2M). The terminal 20 utilizes various communication services provided by a radio communication system by receiving a control signal or data in DL from the base station apparatus 10 and transmitting a control signal or data in UL to the base station apparatus 10. For example, as illustrated in FIG. 1, channels transmitted from the terminal 20 include a Physical Uplink Control Channel (PUCCH) and a Physical Uplink Shared Channel (PUSCH).

In NR, an antenna port is defined such that a channel over which a symbol on the antenna port is conveyed can be inferred from the channel over which another symbol on the same antenna port is conveyed. Two antenna ports are quasi co-located (QCL), for example, if, for a propagation path characteristic including a delay spread, a doppler spread, a doppler shift, average gain, an average delay, a spatial receiving parameter, or the like, the propagation path characteristic of one antenna port can be used to estimate a propagation path characteristic of another antenna port. Namely, if two antenna ports are QCL, large scale characteristics (a delay spread, a Doppler spread, a Doppler shift, average gain, an average delay, a spatial receiving parameter, or the like) of radio channels corresponding to the respective two different antennas can be regarded as equivalent.

Multiple types of QCL are defined. QCL Type A relates to a Doppler shift, a Doppler spread, an average delay, and a delay rate. QCL Type B relates to a Doppler shift and a Doppler spread. QCL Type C relates to a Doppler shift and an average delay. QCL Type D relates to a Spatial Rx parameter.

Here, for example, when a certain SS block and a certain CSI-RS are QCL type D, the terminal 20 can apply the same reception beamforming to receive the SS block and the CSI-RS while assuming that the SS block and the CSI-RS are transmitted from the base station apparatus 10 with the same DL beam. In the following description, it is assumed that, when a type is not explicitly indicated, "QCL" means one or multiple of "QCL type A," "QCL type B," "QCL type C," or "QCL type D."

Figure 2:
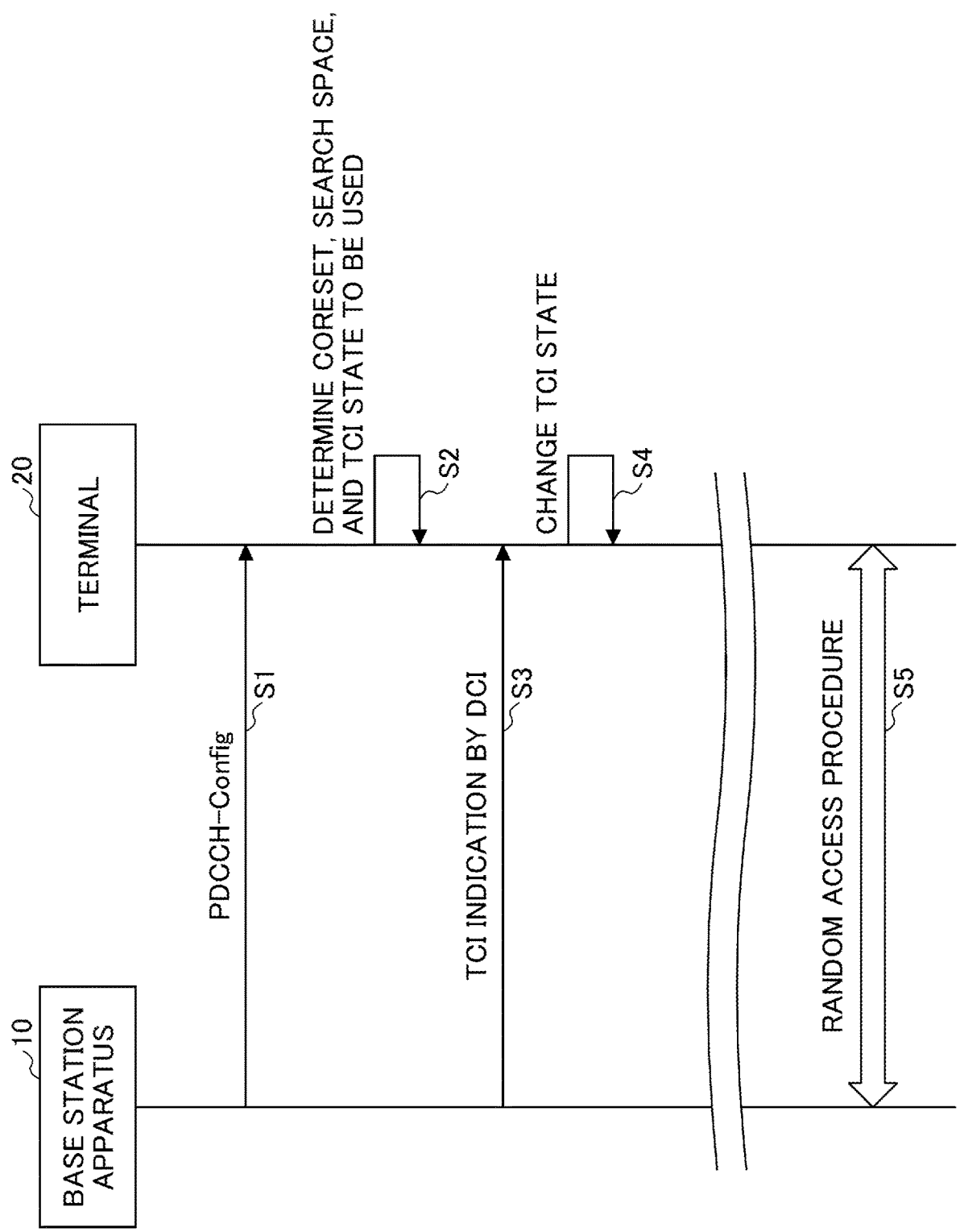
FIG. 2 is a diagram illustrating an example in which a TCI state is configured according to an embodiment of the present invention.

FIG. 2 is a diagram illustrating an example in which a TCI state according to an embodiment of the present invention is configured. In NR, a Transmission configuration indicator (TCI) state is defined. A TCI state indicates a QCL relation of a DL reference signal, and one or more TCI states are included in a Radio Resource Control (RRC) signaling for configuring a control resource set (CORESET: Control resource set). The DL reference signal is an SS block or a CSI-RS. Namely, by using a control resource set, one of TCI states is applied, and a DL reference signal corresponding to the TCI state is determined.

In step S1, the base station apparatus 10 transmits PDCCH-Config to the terminal 20 via RRC signaling. The PDCCH-Config includes information for the terminal 20 to receive PDCCH, and the PDCCH-Config may be signaled to the terminal 20 as broadcast information or may be signaled to the terminal 20 by another RRC signaling. The PDCCH-Config includes information that defines a control resource set and information that defines a search space.

In step S2, the terminal 20 determines a control resource set, a search space, and a TCI state, which are to be used, based on the PDCCH-Config received in step S1. The terminal 20 monitors control information in the determined search space.

In step S3, when information indicating that the TCI state is to be signaled by DCI is included in the PDCCH-Config, the base station apparatus 10 can dynamically signal the TCI state to the terminal 20 by using the DCI that is a PHY layer signaling. Subsequently, the terminal 20 changes the TCI state to the signaled TCI state (S4). Steps S3 and S4 may not be performed.

In step S5, a random access procedure is performed between the base station apparatus 10 and the terminal 20. The terminal 20 assumes QCL based on a SS block or a CSI-RS that is selected to transmit PRACH, and the terminal 20 monitors control information. Steps S1-S4 and Step S5 are executed in any order. Any one of steps S1-S4 and step S5 may be performed first.

Here, a search space for monitoring a control signal is associated with a control resource set. By RRC signaling for configuring a search space, the association between the search space and the control resource set is signaled to the terminal 20. The terminal 20 monitors a control signal corresponding to the control resource set in the search space. If multiple TCI states are configured by RRC signaling, a TCI state may be dynamically changed by Downlink control information (DCI).

As one of search spaces, there is ra-SearchSpace used in a random access procedure, i.e., Type1 PDCCH Common search space (CSS) set. When monitoring Msg2 or Msg4 PDCCH and the corresponding PDSCH in the Type 1 PDCCH CSS set, for contention free random access triggered by a PDCCH order, the QCL assumption is QCL with an SS block or a CSI-RS that is assumed for reception of the PDCCH order.

For random access other than the contention free random access triggered by the PDCCH order, when monitoring Msg2 or Msg4 PDCCH and the corresponding PDSCH in Type 1 PDCCH CSS Set, QCL with the SS block or the CSI-RS selected by the terminal 20 for the PRACH transmission is assumed.

Additionally, as one of search spaces, there is Searchspace #0 for receiving Remaining system information (RMSI) including system information required for performing communication; Other system information (OSI); paging; or the like. For Searchspace #0, monitoring timings are defined for SS blocks transmitted from the base station apparatus 10. That is, in Searchspace #0, unlike other search spaces, monitoring timing differs per assumed SS block.

Figure 3:
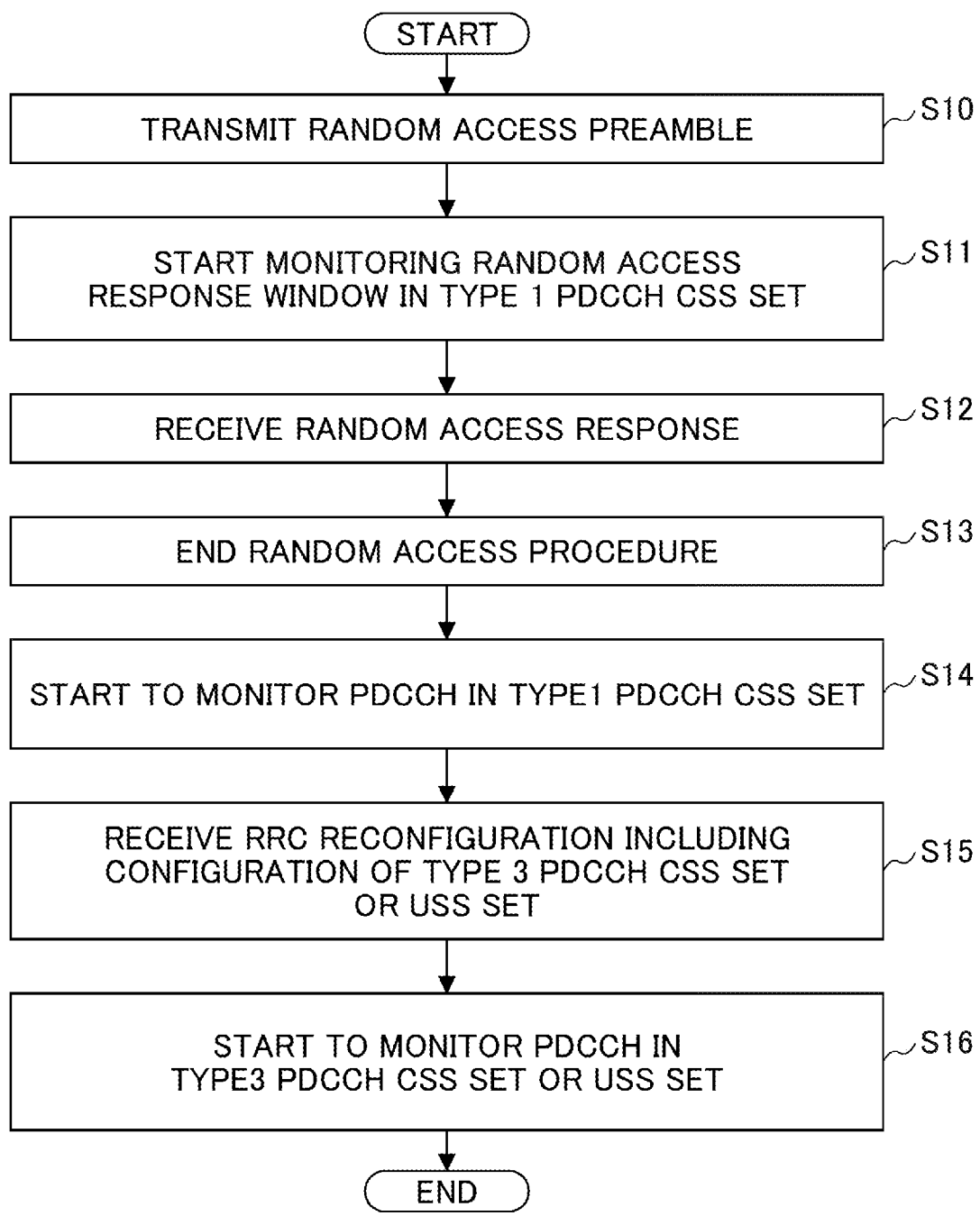
FIG. 3 is a flowchart illustrating an example (1) for monitoring a control signal according to an embodiment of the present invention.

FIG. 3 is a flowchart illustrating an example (1) for monitoring a control signal according to an embodiment of the present invention. The terminal 20 monitors Msg2 or Msg4 PDCCH in Type 1 PDCCH CSS set. Subsequently, if the terminal 20 does not receive a configuration of Type 3 PDCCH CSS set or USS (UE specific search space) set, Type 1 PDCCH CSS set may be used. Namely, until the terminal 20 receives an RRC reconfiguration that includes the configuration of Type 3 PDCCH CSS set or USS set, the Type 1 PDCCH CSS set is used for monitoring PDCCH.

Here, a case in which the terminal 20 does not receive the configuration of the Type 3 PDCCH CSH set or the USS set includes one or both, of the following: a case in which a configuration of Type 3 PDCCH CSS set or USS set is not received from the base station apparatus 10 after an RRC connection is established; and a case in which a configuration of Type 3 PDCCH CSS set or USS set is not received from the base station apparatus 10 after random access is started. Furthermore, "random access" for a case of not receiving a configuration of Type 3 PDCCH CSS set or USS set from the base station apparatus 10 after the start of the random access includes one of the following, or both of the following: a case only corresponding to random access other than contention free random access triggered by a PDCCH order; and a case corresponding to all the types of random access. In the following, "case of not receiving a configuration of Type 3 PDCCH CSS set or the USS set from the base station apparatus 10" corresponds to any of the above-described cases.

The above-described operation in the terminal 20 is described with reference to the flowchart of FIG. 3 corresponding to contention free random access.

In step S10, the terminal 20 transmits a random access preamble. Subsequently, the terminal 20 starts monitoring of a random access response window in Type 1 PDCCH CSS set (S11). The random access response is Msg2. Subsequently, the terminal 20 receives a random access response (S12) and completes the random access procedure (S13).

In step S14, the terminal 20 starts PDCCH monitoring in Type 1 PDCCH CSS set. Here, there is a case in which no QCL assumption is specified for monitoring in the Type 1 PDCCH CSS set by the terminal 20.

Accordingly, until the terminal 20 receiving an RRC reconfiguration including a configuration of Type 3 PDCCH CSS set or USS set, the SS block or the CSI-RS selected by the terminal 20 may always be assumed as QCL for monitoring Type1 PDCCH CSS set, or QCL assumed at the timing of receiving the PDCCH order may be assumed as QCL for monitoring Type1 PDCCH CSS set. Additionally, until receiving an RRC reconfiguration including a configuration of Type 3 PDCCH CSS set or USS set, a TCI state configured for the corresponding CORESET may be ignored.

As another example, until a TCI state of the corresponding CORESET is configured for the terminal 20, the SS block or the CSI-RS selected by the terminal 20 may be assumed as the QCL for monitoring the corresponding Searchspace, or the QCL assumed at the time of receiving the PDCCH order may be assumed for monitoring the corresponding Searchspace In any of the above-described examples, a QCL relationship with a PDCCH order is assumed for contention free random access triggered by the PDCCH order, and a QCL relationship with an SS block or a CSI-RS selected by the terminal 20 is assumed for contention-based random access or random access other than contention free random access triggered by a PDCCH order, such as that of handover. For example, the above-described QCL relationship may be assumed for reception of the following: Msg2 or Msg4 PDCCH and the corresponding PDSCH; PDCCH for triggering Msg3 retransmissions; PDCCH subsequent to Msg 4 and the corresponding PDSCH; and the like.

In step S15, an RRC reconfiguration including the configuration of Type 3 PDCCH CSS set or USS set is received (S15), and PDCCH monitoring in Type 3 PDCCH CSS set or USS set is started (S16).

Figure 4:
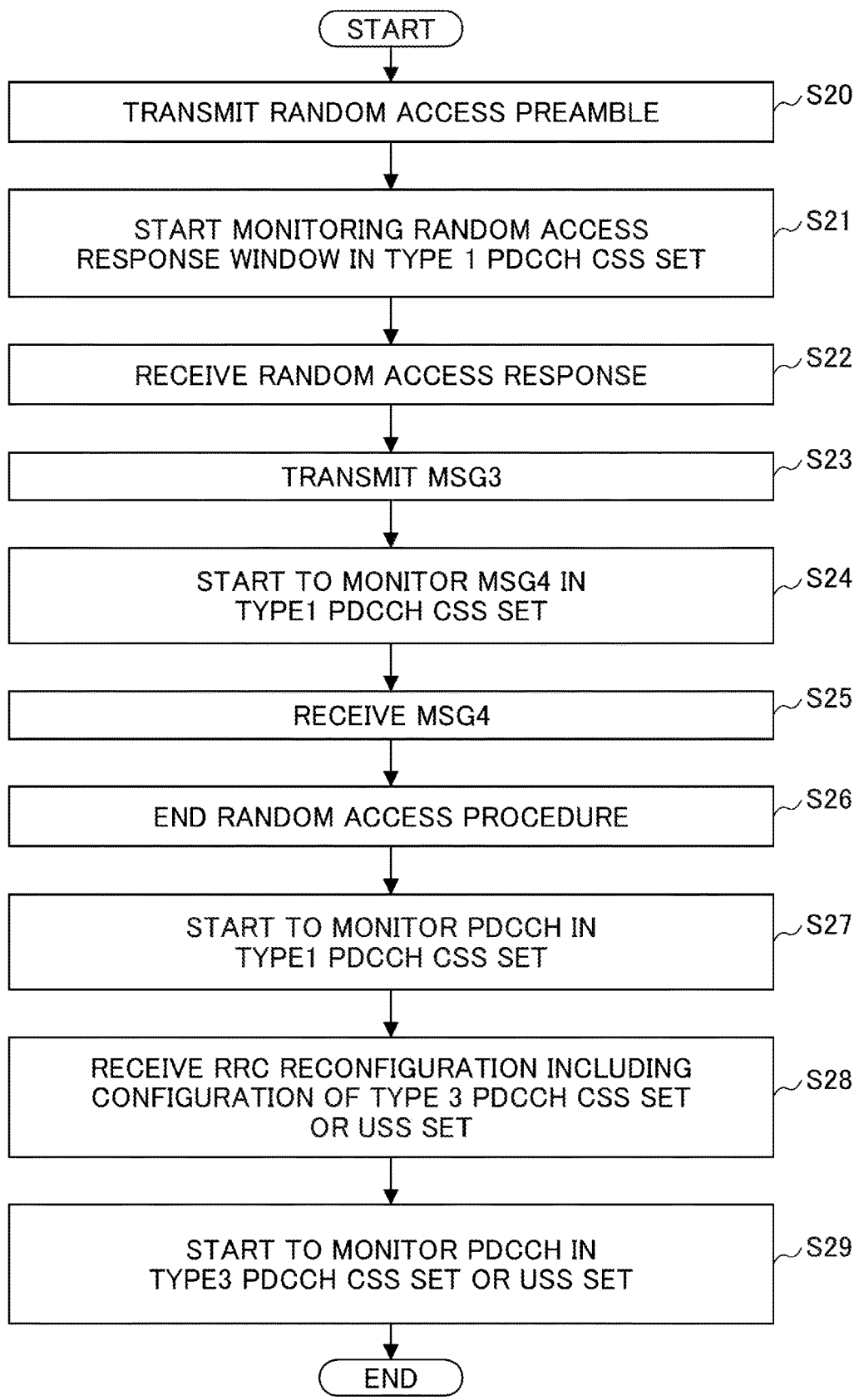
FIG. 4 is a flowchart illustrating an example (2) for monitoring a control signal according to an embodiment of the present invention.

FIG. 4 is a flowchart illustrating an example (2) of monitoring a control signal according to an embodiment of the present invention. In the flowchart of FIG. 4 corresponding to contention-based random access, a difference from the operation in the terminal 20 depicted in FIG. 3 is described. Steps S20 through S22 illustrated in FIG. 4 are the same as steps S10 through S12 illustrated in FIG. 3. Furthermore, steps S27 through S29 illustrated in FIG. 4 are the same as steps S14 through S16 illustrated in FIG. 3.

Steps S23 through S26, illustrated in FIG. 4, are different from steps in FIG. 3. In step S23, the terminal 20 transmits Msg3. Subsequently, the terminal 20 starts monitoring of Msg4 in the Type 1 PDCCH CSS set (S24). Subsequently, the terminal 20 receives Msg4 (S25) and completes the random access procedure (S26).

Here, it is specified that, when the terminal 20 selects an SSB or a CSI-RS, such as a case of contention-based random access or handover, if, after the selection, a PDCCH to be monitored by the terminal 20 in Type1 PDCCH CSS set or the corresponding PDSCH overlaps another PDCCH, and if the other PDCCH is not in a QCL type D relationship with the SSB or the CSI-RS, monitoring need not be performed. The other PDCCH is, for example, PDCCH monitored in Type 0/0A/2/3 PDCCH CSS set or USS set.

Namely, monitoring in the Type 1 PDCCH CSS set is prioritized. However, no similar rule is specified for contention free random access by a PDCCH order.

Accordingly, for contention free random access triggered by a PDCCH order, if a PDCCH to be monitored by the terminal 20 in Type1 PDCCH CSS set or the corresponding PDSCH overlaps another PDCCH, and if the other PDCCH is not in a QCL type D relationship with the PDCCH order, monitoring need not be performed. In other words, it may be specified that, if the other PDCCH is not in a QCL type D relationship with the PDCCH and PDSCH to be monitored in the Type 1 PDCCH CSS set, the terminal 20 is not required to monitor the other PDCCH.

In the following, a configuration of a PDCCH order for contention free random access is described.

A PDCCH order triggering RACH is scrambled by a Cell Specific Radio Network Temporary Identifier (C-RNTI) and can be received in a USS or CSS. After Msg1 (PRACH preamble) triggered by PDCCH order is sent, PDCCH for reception subsequent to Msg2 is monitored only in Type 1 PDCCH CSS. That is, the search space for receiving a PDCCH order may differ from Type 1 PDCCH CSS used for reception subsequent to Msg2. Accordingly, the CORESET for receiving a PDCCH order may differ from CORESET used for reception subsequent to Msg2. The reason is that CORESET is configured on a per search space basis.

Here, because a monitoring occasion changes on a per SS block basis, in searchspace #0, it may not be possible to appropriately perform monitoring based on a CSI-RS. If a CSI-RS is specified as a QCL for PDCCH order reception in contention free random access, and if SSB is specified as QCL for CORESET associated with any searchspace in which important information, such as paging, OSI, or RMSI, is signaled, then paging, OSI, RMSI, or the like may be unable to be monitored, since monitoring of Type 1 PDCCH CSS set is prioritized.

Accordingly, as a configuration of a TCI state of CORESET in which a PDCCH order is transmitted, an SS block may be mandatorily specified as a configuration of QCL type D. Alternatively, the terminal 20 may assume that an SSB is specified as QCL type D, as a configuration of a TCI state of CORESET in which the PDCCH order is transmitted. Additionally, when QCL other than type D is specified, another reference signal, such as a CSI-RS, may be specified.

The operation in which an SS block is specified, assumed, or required as QCL type D for the configuration of the TCI state of the CORESET in which a PDCCH order is transmitted may only be applied if a search space, such as that of paging, OSI, or RMSI, is associated with searchspace #0. Alternatively, the operation in which an SS block is specified, assumed, or required as QCL type D for the configuration of the TCI state of the CORESET to which a PDCCH order is transmitted may only be applied if a TCI state configured for CORESET with which a search space, such as that of paging, OSI, or RMSI, is associated is an SS block. Alternatively, as a configuration of a TCI state of CORESET in which a PDCCH order is transmitted, an SS block may be specified, assumed, or required as a configuration of QCL type D, only if a search space, such as that of paging, OSI, or RMSI, is associated with searchspace #0, and if a TCI state configured for the CORESET with which the search space, such as that of paging, OSI, or RMSI, is associated is the SS block.

Here, as a result of the operation for specifying, assuming, or requiring an SS block as QCL type D for the configuration of a TCI state of CORESET in which a PDCCH order is transmitted, the SS block is used as QCL type D for Type1 PDCCH CSS monitoring during a random access procedure. Accordingly, the terminal 20 can perform monitoring of another CSS, such as that of paging, OSI, or RMSI, at the same time.

According to the above-described embodiments, the terminal 20 can monitor a PDCCH search space while assuming an appropriate QCL, during a random access procedure and after completion of the random access procedure.

That is, in a radio communication system, a terminal can appropriately execute monitoring of a control signal transmitted from a base station apparatus.

In the following, as an example in which a random access procedure is executed, an example of Beam Failure Recovery (BFR) is described. In NR, BFR is specified as a procedure to recover a beam when a failure occurs in a configured beam.

Beam Failure Recovery (BFR) is performed by the terminal 20 based on a Content Free Random Access procedure (CFRA).

However, when a beamFailureRecoveryTimer expires, the terminal 20 falls back to a Content Based Random Access procedure (CBRA), and the terminal 20 executes BFR with CBRA.

When the terminal 20 performs BFR with CBRA, the base station apparatus 10 may be unable to find whether the terminal 20 is executing CBRA for a BFR purpose or for another purpose.

To solve this problem, it has been proposed to separate rules for selecting SSB for CBRA, between BFR and other purposes (Non-Patent Document 3 and Non-Patent Document 4).

Specifically, in Non-Patent Document 3, it has been proposed to introduce an SSB selection prioritization rule in CBRA, depending on a purpose (condition) of triggering the CBRA.

(1) When CBRA is performed for a purpose other than BFR, the terminal 20 prioritizes an SSB corresponding to a beam configured for receiving PDCCH, and the terminal 20 indicates to a NW that no TCI configuration is required.

(2) If CBRA is performed for BFR, the terminal 20 prioritizes an SSB other than an SSB corresponding to a beam configured for receiving PDCCH, and the terminal 20 signals to the NW that a new TCI configuration is required for BFR.

The following Observations are described in Non-Patent Document 3.

Observation 1: The terminal 20 assumes a beam indicated by a CFRA preamble for PDCCH reception until TCI activation is received or until RRC reconfigures the TCI state configuration.

Observation 2: After receiving Msg4, the terminal 20 falls back using the configuration for PDCCH reception that has been active prior to the RA procedure. However, there is a problem with this procedure in regard to BFR, and this procedure may lead to subsequent beam failure detections.

As described above, it can be considered that it is not necessary to assume QCL at the time of CFRA upon fallback to CBRA.

Accordingly, when BFR is performed with CBRA, the terminal 20 may fall back to the CBRA without taking over the configuration for PDCCH reception that was active prior to the RA procedure, and the terminal 20 may use an SSB detected for selection of a random access preamble in CBRA as QCL.

In the following, the above-described subject matter is described in more detail.

With respect to contention-based PRACH transmission in slot n, upon expiration of a beamFailureRecoveryTimer, the terminal 20 monitors PDCCH in a search space set configured by ra-SearchSpace or searchSpaceZero for detection of DCI with RA-RNTI scrambled CRC starting from slot n+4 in a window configured by ra-ResponseWindow.

With respect to PDCCH monitoring and receipt of the corresponding PDSCH in the search space set configured by ra-SearchSpace or searchSpaceZero, the terminal 20 assumes a DM-RS antenna port quasi-collocation parameter that is the same as a DM-RS antenna port quasi-collocation parameter associated with a SS/PBCH block selected by the terminal 20 for the contention-based PRACH transmission, until the terminal 20 receives any parameter from among TCI state activation or TCI-StatesPDCCH-ToAddlist and/or TCI-StatesPDCCH-ToReleaseList by a higher layer.

After the terminal 20 detects a DCI format having a CRC scrambled with RA-RNTI in the search space configured by ra-SearchSpace or searchSpaceZero, the terminal 20 continues monitoring a PDCCH candidate in the search space configured by ra-SearchSpace or searchSpaceZero until the terminal 20 receives a MAC CE activation command for TCI state or TCI-StatesPDCCH-ToAddlist and/or TCI-StatesPDCCH-ToRelease List.

Since a RA preamble for CBRA and an SSB are associated, if the detected SSB is used as QCL, the base station apparatus 10 can also find QCL assumed by the terminal 20 from the random access preamble transmitted from the base station apparatus 10. Since the QCL at the time of CFRA is not assumed upon fallback to CBRA, a change in the specification and implementation of a terminal can be reduced.

(Clarification of a Beam Assumed after CBRA BFR)

In the following, a method of clarifying a beam (QCL, spatial relation) that should be assumed by the terminal 20 after beam failure recovery (BFR) by using a contention based random access procedure (CBRA) is described.

For link recovery via a non-contention-based random access procedure (CFRA), the terminal 20 may be configured with a Control Resource Set (CORESET) through a link to a search space set configured by using recoverySearchSpaceId, which is a higher layer parameter, and the terminal 20 may monitor a PDCCH in the CORESET. In a case where the terminal 20 is configured with recoverySearchSpaceId, the terminal 20 need not expect that there is provided another search space set to monitor a PDCCH in the CORESET associated with the search space set configured by using recoverySearchSpaceId.

For the link recovery via CFRA, the terminal 20 may receive a configuration for a PRACH transmission through PRACH-ResourceDedicated BFR, which is a higher layer parameter.

In accordance with a quasi-collocation parameter of an antenna port that is for a PRACH transmission in slot n and that is associated with a periodic CSI-RS resource configuration, or a quasi-collocation parameter associated with an SS/PBCH block associated with an index $q_{new}$ configured by a higher layer, the terminal 20 may monitor a PDCCH in a search space set that is configured by using recoverySearchSpaceId and that is started from slot n+4 in a window configured by using BeamFailureRecoveryConfig that is a higher layer parameter, in order to detect a DCI format with CRC scrambled by C-RNTI or MCS-C-RNTI.

As for the PDCCH monitoring in the search space configured by using recoverySearchSpaceId and the corresponding PDSCH reception, the terminal 20 may assume an antenna port quasi-collocation parameter that is the same as the antenna port quasi-collocation parameter associated with the index $q_{new}$, until the terminal 20 receives a TCI state activation, or until the terminal 20 receives one of more of a higher layer parameter, TCI-StatesPDCCH-ToAddlist, and/or a higher layer parameter, TCI-StatesPDCCH-ToReleaseList.

After the terminal 20 detects the DCI format with the CRC scrambled by the C-RNTI or the MCS-C-RNTI in the search space set configured by using recoverySearchSpaceId, the terminal 20 may continue monitoring the search space set configured by using the recoverySearchSpaceId for a PDCCH candidate, until the terminal 20 receives a MAC CE activation command for a TCI state, or until the terminal 20 receives TCI-StatesPDCCH-ToAddlist and/or TCI-StatesPDCCH-ToReleaseList.

For the link recovery via CFRA, after 28 symbols from the last symbol of a first PDCCH reception in the search space set configured by using the recoverySearchSpaceId for which the terminal 20 detects the DCI with the CRC scrambled by the C-RNTI or the MCS-C-RNTI and until the terminal 20 receives an activation command for a higher layer parameter, PUCCH-Spatialrelationinfo, or until the terminal 20 is configured with the PUCCH-Spatialrelationinfo for a PUCCH resource, the terminal 20 may transmit a PUCCH by using a spatial filter that is the same as the spatial filter applied to the latest PRACH transmission in a cell that is the same as the cell in which the PRACH transmission was performed. The transmit power for the PUCCH transmission may be specified by a technical specification.

For the link recovery via CFRA, after 28 symbols from the last symbol of the first PDCCH reception in the search space set configured by using the recoverySearchSpaceId where the terminal 20 detects the DCI format with the CRC scrambled by the C-RNTI or the MCS-C-RNTI, the terminal 20 may assume an antenna port quasi-collocation parameter that is the same as the antenna port quasi-collocation parameter associated with the index $q_{new}$ for PDCCH monitoring in the CORESET with index 0.

When the beamFailureRecoveryTimer expires, the link recovery may be performed via CBRA.

First Example

In the following, a first example of a case of link recovery via CBRA is described. For the link recovery via CFRA, after 28 symbols from a last symbol of a first PDCCH reception (in the direction of time) in a search space set configured by using a higher layer parameter, ra-SearchSpace, where the terminal 20 detects DCI with a CRC scrambled by RA-RNTI and until the terminal 20 receives an activation command for PUCCH-Spatialrelationinfo, or until the terminal 20 is configured with the PUCCH-Spatialrelationinfo for a PUCCH resource, the terminal 20 may transmit a PUCCH by using a spatial filter that is the same as the spatial filter applied to the latest PRACH transmission in a cell that is the same as the cell in which the PRACH transmission was performed. The transmit power for the PUCCH transmission may be specified by a technical specification.

According to this configuration, a beam (QCI, spatial relation) assumed by the terminal 20 after BFR via CBRA can be clarified.

Second Example

In the following, a second example of a case of link recovery via CBRA is described. For link recovery via CBRA, after 28 symbols from the last symbol of a first PDCCH reception (in the direction of time) in a search space set configured by using the ra-SearchSpace where the terminal 20 detects a DCI format with a CRC scrambled by RA-RNTI, the terminal 20 may assume an antenna port quasi-collocation parameter that is the same as the antenna port quasi-collocation parameter associated with an index $q_{new}$ for PDCCH monitoring in a CORESET with index 0 (i.e., the CORESET configured by using system information).

According to this configuration, a beam (QCI) assumed by the terminal 20 after BFR via CBRA can be clarified.

Modified Example of the First Example

In the above-described first example, the case of the link recovery via CBRA is assumed. However, the embodiments are not limited to this example. For example, in the above-described first example, a normal CBRA other than the case of the link recovery via CBRA may be assumed. According to this configuration, the operations of the terminal 20 and the base station 10 can be made common between CBRA for BFR and a normal CBRA, so that the operations of the terminal 20 and the base station 10 can be simplified.

Modified Example of the Second Example

In the above-described second example, the case of the link recovery via CBRA is assumed. However, the embodiments are not limited to this example. For example, in the above-described second example, a normal CBRA other than the case of the link recovery via CBRA may be assumed. According to this configuration, the operations of the terminal 20 and the base station 10 made common between CBRA for BFR and a normal CBRA, so that the operations of the terminal 20 and the base station 10 can be simplified.

(Device Configuration)

Next, a functional configuration example of the base station apparatus 10 and the terminal 20 for performing the processes and operations described above is described. The base station apparatus 10 and the terminal 20 include functions for implementing the above-described embodiments. However, each of the base station apparatus 10 and the terminal 20 may include only a part of the functions in the embodiments.

<Base Station Apparatus 10>

Figure 5:
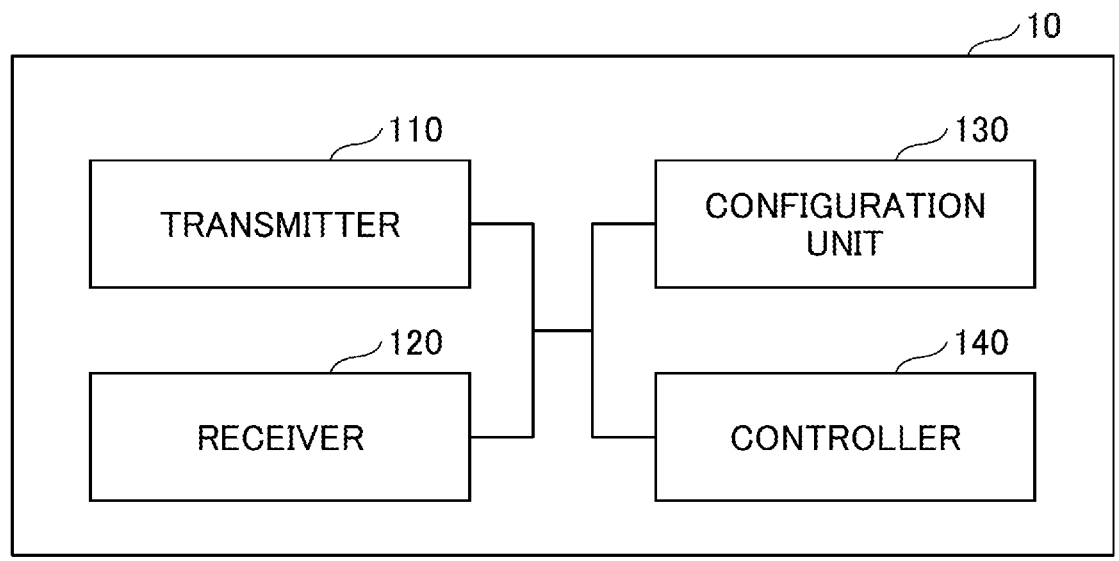
FIG. 5 is a diagram illustrating an example of a functional configuration of a base station apparatus 10 according to an embodiment of the present invention.

FIG. 5 is a diagram illustrating an example of a functional configuration of the base station apparatus 10. As illustrated in FIG. 5, the base station apparatus 10 includes a transmitter 110, a receiver 120, a configuration unit 130, and a controller 140. The functional configuration illustrated in FIG. 5 is merely one example. The functional division and names of functional units may be any division and names, provided that the operation according to the embodiments of the present invention can be performed.

The transmitter 110 includes a function for generating a signal to be transmitted to the terminal 20 side and transmitting the signal through radio. The receiver 120 includes a function for receiving various types of signals transmitted from the terminal 20 and acquiring, for example, information of a higher layer from the received signals. The transmitter 110 has a function to transmit NR-PSS, NR-SSS, NR-PBCH, DL/UL control signals, or the like to the terminal 20.

The configuration unit 130 stores preconfigured configuration information and various types of configuration information to be transmitted to the terminal 20 in the storage device, and reads out the configuration information from the storage device if necessary. Details of the configuration information are, for example, control information of the terminal 20 and information on random access.

As described in the embodiments, the controller 140 performs a process for generating control information to be transmitted to the terminal. The controller 140 controls a random access procedure with the terminal 20. A functional unit related to signal transmission in the controller 140 may be included in the transmitter 110, and a functional unit related to signal reception in the controller 140 may be included in the receiver 120.

<Terminal 20>

Figure 6:
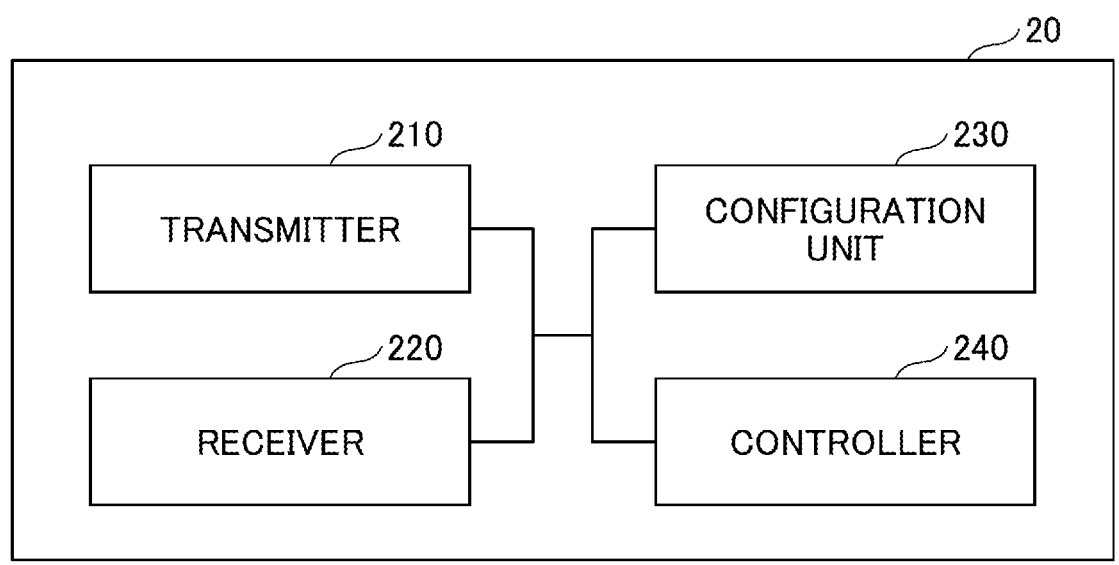
FIG. 6 is a diagram illustrating an example of a functional configuration of a terminal 20 according to an embodiment of the present invention.

FIG. 6 is a diagram illustrating an example of a functional configuration of the terminal 20. As illustrated in FIG. 6, the terminal 20 includes a transmitter 210, a receiver 220, a configuration unit 230, and a controller 240. The functional configuration illustrated in FIG. 6 is merely an example. The functional division and names of functional units may be any division and names, provided that the operation according to the embodiments of the present invention can be performed.

The transmitter 210 creates a transmission signal from transmission data and transmits the transmission signal through radio. The receiver 220 receives various types of signals wirelessly and acquires higher layer signals from the received physical layer signals. The receiver 220 has a function to receive NR-PSS, NR-SSS, NR-PBCH, DL/UL/SL control signals, or the like transmitted from the base station apparatus 10. For example, the transmitter 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), or the like to another terminal 20 as D2D communication, and the receiver 120 receives PSCCH, PSSCCH, PSDCH, PSBCH, or the like from the other terminal 20.

The configuration unit 230 stores various types of configuration information received from the base station apparatus 10 or the terminal 20 by the receiver 220 in the storage device and reads out the configuration information from the storage device if necessary. The configuration unit 230 also stores preconfigured configuration information. Details of the configuration information are, for example, control information of the terminal 20 and information related to random access.

As described in the embodiments, the controller 240 monitors a control signal based on control information obtained from the base station apparatus 10. The controller 240 controls a random access procedure with the base station apparatus 10. A functional unit related to signal transmission in the controller 240 may be included in the transmitter 210, and a functional unit related to signal reception in the controller 240 may be included in the receiver 220.

(Hardware Configuration)

The block diagrams (FIG. 5 and FIG. 6) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 7:
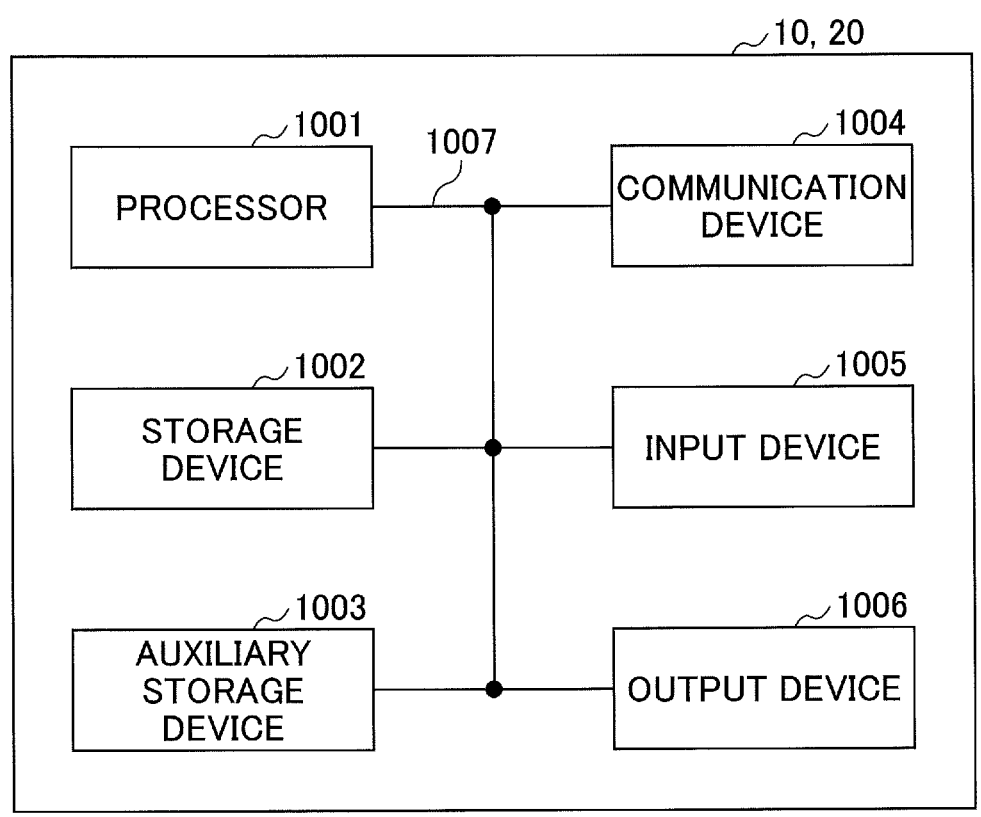
FIG. 7 is an example of the hardware configuration of the base station apparatus 10 or the terminal 20 according to an embodiment of the present invention.

For example, the base station apparatus 10, the terminal 20, and the like according to an embodiment of the present disclosure may function as computers performing the process of the radio communication according to the present disclosure. FIG. 7 is a diagram illustrating an example of a hardware configuration of the base station apparatus 10 and the terminal 20 according to the present disclosure. Each of the above-described base station apparatus 10 and terminal 20 may be physically configured as a computer device including a processor 1001, a storage device 1002, an auxiliary storage device 1003, a communication device 1004, an input device 1005, an output device 1006, a bus 1007, and the like.

Note that, in the following description, the term "device" can be replaced with a circuit, a device, a unit, or the like. The hardware configuration of the base station apparatus 10 and the terminal 20 may be configured to include one or more of the devices depicted in the figure, or may be configured without some devices.

Each function of the base station apparatus 10 and the terminal 20 is implemented by loading predetermined software (program) on hardware, such as the processor 1001 and the storage device 1002, so that the processor 1001 performs computation and controls communication by the communication device 1004, and at least one of reading and writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, or the like. For example, the controller 140, the controller 240, and the like, which are described above, may be implemented by the processor 1001.

Additionally, the processor 1001 reads a program (program code), a software module, data, or the like, from at least one of the auxiliary storage device 1003 and the communication device 1004 to the storage device 1002, and executes various processes according to these. As the program, a program is used which causes a computer to execute at least a part of the operations described in the above-described embodiment. For example, the controller 140 of the base station apparatus 10 may be implemented by a control program that is stored in the storage device 1002 and that is operated by the processor 1001. Furthermore, for example, the controller 240 of the terminal 20 may be implemented by a control program that is stored in the storage device 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The storage device 1002 is a computer readable storage medium, and, for example, the storage device 1002 may be formed of at least one of a Read Only Memory (ROM), an Erasable Programmable ROM (EPROM), an Electrically Erasable Programmable ROM (EEPROM), a Random Access Memory (RAM), or the like. The storage device 1002 may be referred to as a register, a cache, a main memory (main storage device), or the like. The storage device 1002 may store a program (program code), a software module, or the like, which can be executed for implementing the radio communication method according to the embodiments of the present disclosure.

The auxiliary storage device 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, a magnetic strip, or the like. The auxiliary storage device 1003 may be referred to as an auxiliary storage device. The above-described storage medium may be, for example, a database including at least one of the storage device 1002 and the auxiliary storage device 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like, to implement at least one of frequency division duplex (FDD: Frequency Division Duplex) and time division duplex (TDD: Time Division Duplex). For example, the transmitting/receiving antenna, the amplifier unit, the transmitting/receiving unit, the transmission line interface, or the like, may be implemented by the communication device 1004. In the transmitting/receiving unit, a transmitting unit and a receiving unit may be implemented to be physically or logically separated.

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the storage device 1002, is also connected by the bus 1007 for communicating information. The bus 1007 may be formed of a single bus or may be formed of different buses between devices.

The base station apparatus 10 and the terminal 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

CONCLUSION OF THE EMBODIMENTS

In this specification, at least the terminal and the communication method described below are disclosed.

A terminal including a transmitter that transmits a random access preamble; a receiver that receives a random access response; and a controller that uses a spatial filter applied to the transmission of the random access preamble for a transmission of an uplink control signal, in a time interval after the receiver receives the random access response until the receiver receives configuration information of another spatial filter.

According to the above-described configuration, a beam (QCL, spatial relation) assumed by the user equipment after BFR via CBRA can be clarified. Furthermore, when the above-described configuration is applied to a normal CBRA other than the case of link recovery via CBRA, the operations of the terminal and the base station can be made common between CBRA for BFR and the normal CBRA, so that the operations of the terminal and the base station can be simplified.

The random access preamble may be applied to a contention-based random access procedure for performing Beam Failure Recovery (BFR).

According to the above-described configuration, a beam (QCL, spatial relation) assumed by the user equipment after BFR via CBRA can be clarified.

The controller may use the spatial filter applied to the transmission of the random access preamble for the transmission of the uplink control signal, in a time interval after 28 symbols from a last symbol of a physical downlink control channel (PDCCH) on which the receiver receives the random access response for a first time until the receiver receives the configuration information of the another spatial filter.

After the receiver receives the random access response, the controller may set an antenna port quasi-collocation parameter associated with an index for physical downlink control channel (PDCCH) monitoring in a control resource set (CORESET) with an index 0, as an antenna port quasi-collocation parameter.

According to the above-described configuration, an antenna port quasi-collocation parameter assumed by the user equipment after BFR via CBRA can be clarified.

A communication method executed by a terminal, the method including transmitting a random access preamble; receiving a random access response; and using a spatial filter applied to the transmission of the random access preamble for a transmission of an uplink control signal, in a time interval after receiving the random access response until receiving configuration information of another spatial filter.

According to the above-described configuration, a beam (QCL, spatial relation) assumed by the user equipment after BFR via CBRA can be clarified. Furthermore, when the above-described configuration is applied to a normal CBRA other than the case of link recovery via CBRA, the operations of the terminal and the base station can be made common between CBRA for BFR and the normal CBRA, so that the operations of the terminal and the base station can be simplified.

SUPPLEMENTAL EMBODIMENTS

While the embodiments of the present invention are described above, the disclosed invention is not limited to the embodiments, and those skilled in the art will appreciate various alterations, modifications, alternatives, or substitutions. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (as long as there is no contradiction) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no inconsistency. For the convenience of the description of the process, the base station apparatus 10 and the terminal 20 are described using functional block diagrams, but such devices may be implemented in hardware, software, or a combination thereof. Software operated by a processor included in the base station apparatus 10 in accordance with embodiments of the present invention and software operated by a processor included in the terminal 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/ embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, UMB (Ultra Mobile Broadband), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, or the like of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by the base station apparatus 10 may be performed by an upper node in some cases. It is apparent that in a network consisting of one or more network nodes having base station apparatus 10, various operations performed for communicating with terminal 20 may be performed by at least one of the base station apparatus 10 and a network node other than the base station apparatus (e.g., MME or S-GW can be considered, however, the network node is not limited to these). The case is exemplified above in which there is one network node other than the base station apparatus 10. However, the network node other than the base station apparatus 10 may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. Output information may be deleted. The input information may be transmitted to another device.

The determination in the disclosure may be made by a value (0 or 1) represented by 1 bit, by a true or false value (Boolean: true or false), or by comparison of numerical values (e.g., a comparison with a predefined value).

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, or the like As used in this disclosure, the terms "system" and "network" are used interchangeably.

The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," or the like may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH: Remote Radio Head)). The term "cell" or "sector" refers to a portion or all of the coverage area of at least one of the base station and base station subsystem that provides communication services at the coverage.

In this disclosure, terms such as "mobile station (MS: Mobile Station)," "user terminal," "user equipment (UE: User Equipment)," or "terminal," may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an IoT (Internet of Things) device such as a sensor.

In addition, the base station in the present disclosure may be read by the user terminal. For example, various aspects/embodiments of the present disclosure may be applied to a configuration in which communication between the base stations and the user terminal is replaced with communication between multiple user terminals 20 (e.g., may be referred to as Device-to-Device (D2D) or Vehicle-to-Everything (V2X)). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel.

Similarly, the user terminal in the present disclosure may be replaced with the base station. In this case, a configuration may be such that the above-described function of the user terminal may be included in the base station.

The terms "determine (determining)" and "decide (determining)" used in this disclosure may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be replaced with "assuming," "expected," "considering," or the like The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

Any reference to elements using names, such as "first" and "second," as used in this disclosure does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

The "means" in the configuration of each of the above-described devices may be replaced with "part," "circuit," "device," or the like As long as "include," "including," and variations thereof are used in this disclosure, the terms are intended to be inclusive in a manner similar to the term "comprising." Furthermore, the term "or" used in the disclosure is intended not to be an exclusive OR.

A radio frame may be formed of one or more frames in the time domain. In the time domain, each of the one or more frames may be referred to as a subframe. A subframe may further be formed of one or more slots in the time domain. A subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS: SubCarrier Spacing), a bandwidth, a symbol length, a cyclic prefix length, a transmission time interval (TTI: Transmission Time Interval), a symbol number per TTI, a radio frame configuration, a specific filtering process performed by a transceiver in a frequency domain, a specific windowing process performed by a transceiver in a time domain, or the like.

A slot may be formed of, in a time domain, one or more symbols (Orthogonal Frequency Division Multiplexing (OFDM) symbols, Single Carrier Frequency Division Multiple Access (SC-FDMA) symbols, or the like). A slot may be a unit of time based on the numerology.

A slot may include a plurality of mini-slots. In a time domain, each mini-slot may be formed of one or more symbols. A mini-slot may also be referred to as a sub-slot. A mini-slot may be formed of fewer symbols than those of a slot. The PDSCH (or PUSCH) transmitted in a unit of time that is greater than a mini-slot may be referred to as PDSCH (or PUSCH) mapping type A. The PDSCH (or PUSCH) transmitted using a mini-slot may be referred to as PDSCH (or PUSCH) mapping type B.

Each of the radio frame, subframe, slot, mini-slot, and symbol represents a time unit for transmitting a signal. The radio frame, subframe, slot, mini-slot, and symbol may be called by respective different names.

For example, one subframe may be referred to as a transmission time interval (TTI: Transmission Time Interval), a plurality of consecutive subframes may be referred to as TTI, or one slot or one mini-slot may be referred to as TTI. Namely, at least one of a subframe and TTI may be a subframe (1 ms) in the existing LTE, may be a time interval shorter than 1 ms (e.g., 1 to 13 symbols), or a time interval longer than 1 ms. Note that the unit representing the TTI may be referred to as a slot, a mini-slot, or the like, instead of a subframe.

Here, the TTI refers to, for example, the minimum time unit of scheduling in radio communication. For example, in the LTE system, the base station performs scheduling for allocating radio resources (such as a frequency bandwidth or transmission power, that can be used in each terminal 20) in units of TTIs to each terminal 20. Note that the definition of the TTI is not limited to this.

The TTI may be a transmission time unit, such as a channel coded data packet (transport block), a code block, and a codeword, or may be a processing unit for scheduling, link adaptation, or the like. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit of scheduling. Additionally, the number of slots (the number of mini-slots) forming the minimum time unit of scheduling may be controlled.

A TTI with a time length of 1 ms may be referred to as an ordinary TTI (TTI in LTE Rel. 8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (partial TTI or fractional TTI), a shortened subframe, a short subframe, a mini-slot, a sub-slot, a slot, or the like.

Note that a long TTI (e.g., a normal TTI or a subframe) may be replaced with a TTI with a time length exceeding 1 ms, and a short TTI (e.g., a shortened TTI) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in a RB may be the same irrespective of numerology, and may be 12, for example. The number of subcarriers included in a RB may be determined based on numerology.

Additionally, the resource block may include one or more symbols in the time domain, and may have a length of one slot, one mini-slot, one subframe, or one TTI. Each of one TTI and one subframe may be formed of one or more resource blocks.

Note that one or more may be referred to as a physical resource block (PRB: Physical RB), a subcarrier group (SCG: Sub-Carrier Group), a resource element group (REG: Resource Element Group), a PRB pair, a RB pair, or the like.

Additionally, a resource block may be formed of one or more resource elements (RE: Resource Element). For example, 1 RE may be a radio resource area of 1 subcarrier and 1 symbol.

A bandwidth part (BWP: Bandwidth Part) (which may also be referred to as a partial bandwidth, or the like) may represent, in a certain carrier, a subset of consecutive common RB (common resource blocks) for a certain numerology. Here, the common RB may be specified by an index of a RB when a common reference point of the carrier is used as a reference. A PRB may be defined in a BWP, and may be numbered in the BWP.

The BWP may include a BWP for UL (UL BWP) and a BWP for DL (DL BWP). For a UE, one or more BWPs may be configured within one carrier.

At least one of the configured BWPs may be active, and the UE is may not assume that a predetermined signal/channel is communicated outside the active BWP. Note that "cell," "carrier," or the like in the present disclosure may be replaced with "BWP."

The structures of the above-described radio frame, subframe, slot, mini-slot, symbol, and the like are merely illustrative. For example, the following configurations can be variously changed: the number of subframes included in the radio frame; the number of slots per subframe or radio frame; the number of mini-slots included in the slot; the number of symbols and RBs included in the slot or mini-slot; the number of subcarriers included in the RB; and the number of symbols, the symbol length, the cyclic prefix (CP: Cyclic Prefix) length, or the like, within the TTI.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated," "coupled," or the like, may also be interpreted similarly.

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

In this disclosure, QCL type D is an example of QCL information. An SS block or CSI-RS is an example of a synchronization or reference signal. A PDCCH order is an example of a control channel indication. The Type 1 PDCCH CSS set is an example of the first search space. Type 0/0A/2/3 PDCCH CSS set or USS set is an example of a second search space. Type 0 PDCCH CSS set or Searchspace #0 is an example of a third search space.

While the present disclosure is described in detail above, those skilled in the art will appreciate that the present disclosure is not limited to the embodiments described in the present disclosure. The disclosure may be implemented as modifications and variations without departing from the gist and scope of the disclosure as defined by the claims. Accordingly, the description of the present disclosure is for illustrative purposes only and is not intended to have any restrictive meaning with respect to the present disclosure.

LIST OF REFERENCE SYMBOLS 10 base station apparatus
110 transmitter
120 receiver
130 configuration unit
140 controller
20 terminal
210 transmitter
220 receiver
230 configuration unit
240 controller
1001 processor
1002 storage device
1003 auxiliary storage device
1004 communication device
1005 input device
1006 output device

The invention claimed is:

1. A terminal comprising:
a transmitter that transmits a random access preamble, wherein a spatial filter is applied to the transmission of the random access preamble;
a receiver that receives a random access response; and
a controller that is configured to perform a random access procedure for executing beam failure recovery,
wherein before a beam failure recovery time expires, the controller is configured to perform a contention-free random access procedure,
wherein, when the beam failure recovery time expires, the controller is configured to perform a contention-based random access procedure, the random access preamble being applied to the contention-based random access procedure, and wherein the controller is configured to use the spatial filter applied to the transmission of the random access preamble for a transmission of an uplink control channel (PUCCH), in a time interval after 28 symbols from a last symbol of a first physical downlink control channel (PDCCH) for the random access response and until the receiver receives an activation command for PUCCH-SpatialRelationInfo or until the PUCCH-SpatialRelationInfo is configured.

2. The terminal according to claim 1, wherein, after the receiver receives the random access response, the controller sets an antenna port quasi-collocation parameter associated with an index for physical downlink control channel (PDCCH) monitoring in a control resource set (CORESET) with an index 0, as an antenna port quasi-collocation parameter.

3. The terminal of claim 1, wherein, with respect to monitoring of the PDCCH and receipt of a corresponding Physical Downlink Shared Channel (PDSCH), the controller assumes a DeModulation Reference Signal (DM-RS) antenna port quasi-collocation parameter that is a same as a DM-RS antenna port quasi-collocation parameter associated with a Synchronization Signal/Physical Broadcast Channel (SS/PBCH) block selected to transmit the random access preamble.

4. A communication method executed by a terminal, the method comprising:
   transmitting a random access preamble, wherein a spatial filter is applied to the transmission of the random access preamble;
   receiving a random access response; and
   performing a random access procedure for executing beam failure recovery,
   wherein before a beam failure recovery time expires, the performing performs a contention-free random access procedure,
   wherein, when the beam failure recovery time expires, the performing performs a contention-based random access procedure, the random access preamble being applied to the contention-based random access procedure, and
   wherein the performing uses the spatial filter applied to the transmission of the random access preamble for a transmission of an uplink control channel (PUCCH), in a time interval after 28 symbols from a last symbol of a first physical downlink control channel (PDCCH) for the random access response and until receiving an activation command for PUCCH-SpatialRelationInfo or until the PUCCH-SpatialRelationInfo is configured.

5. A base station comprising:
   a receiver that receives a random access preamble from a terminal, wherein a spatial filter is applied to the transmission of the random access preamble;
   a transmitter that transmits a random access response; and
   a controller that controls an uplink control channel (PUCCH) reception for which the spatial filter applied to the reception of the random access preamble is used, in a time interval after 28 symbols from a last symbol of a first physical downlink control channel (PDCCH) for the random access response and until the transmitter transmits an activation command for PUCCH-SpatialRelationInfo or until the PUCCH-SpatialRelationInfo is configured in the terminal,
   wherein the terminal is configured to perform a random access procedure for executing beam failure recovery, the random access procedure being a contention-free random access procedure before a beam failure recovery time expires, and
   wherein the random access preamble is applied to a contention-based random access procedure for performing the beam failure recovery after the beam failure recovery time expires.

* * * * *